Sept. 20, 1971          B. R. MINNESS          3,605,696
                        AVIARY STRUCTURE
Filed Nov. 24, 1969                           3 Sheets-Sheet 3
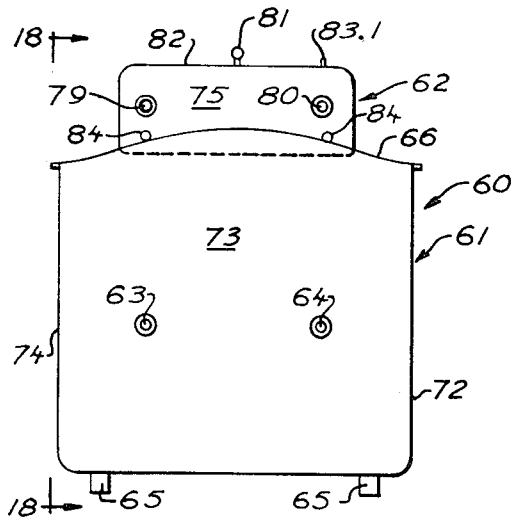
Fig. 17.
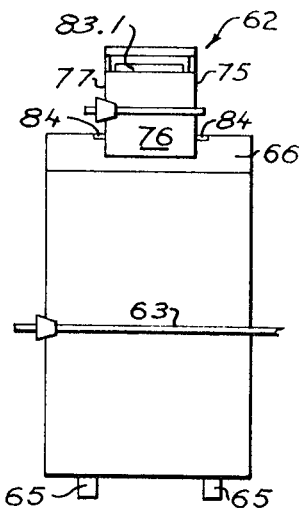
Fig. 18.
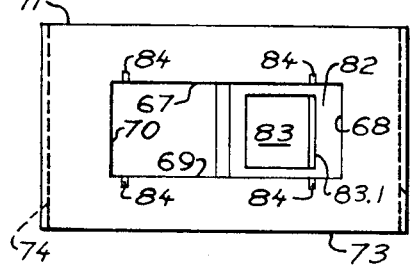
Fig. 19.
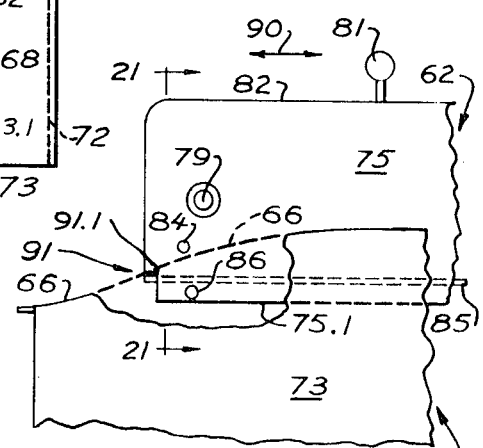
Fig. 20.
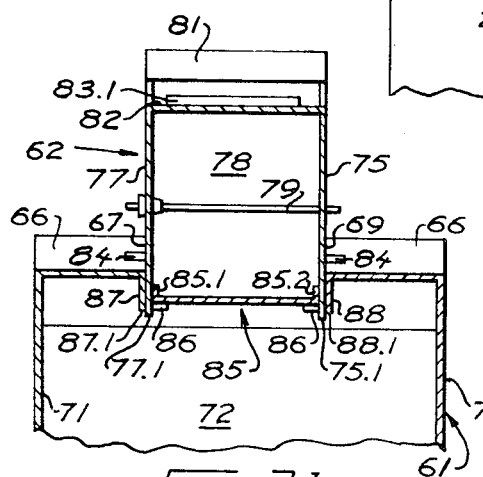
Fig. 21.
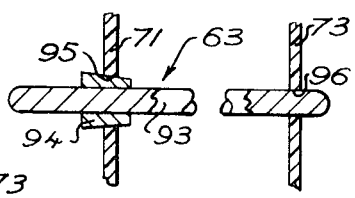
Fig. 22.
Benjamin R. Minness,
Inventor
by 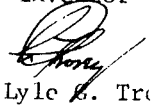
Lyle E. Trorey,
Agent United States Patent Office 3,605,696
Patented Sept. 20, 1971

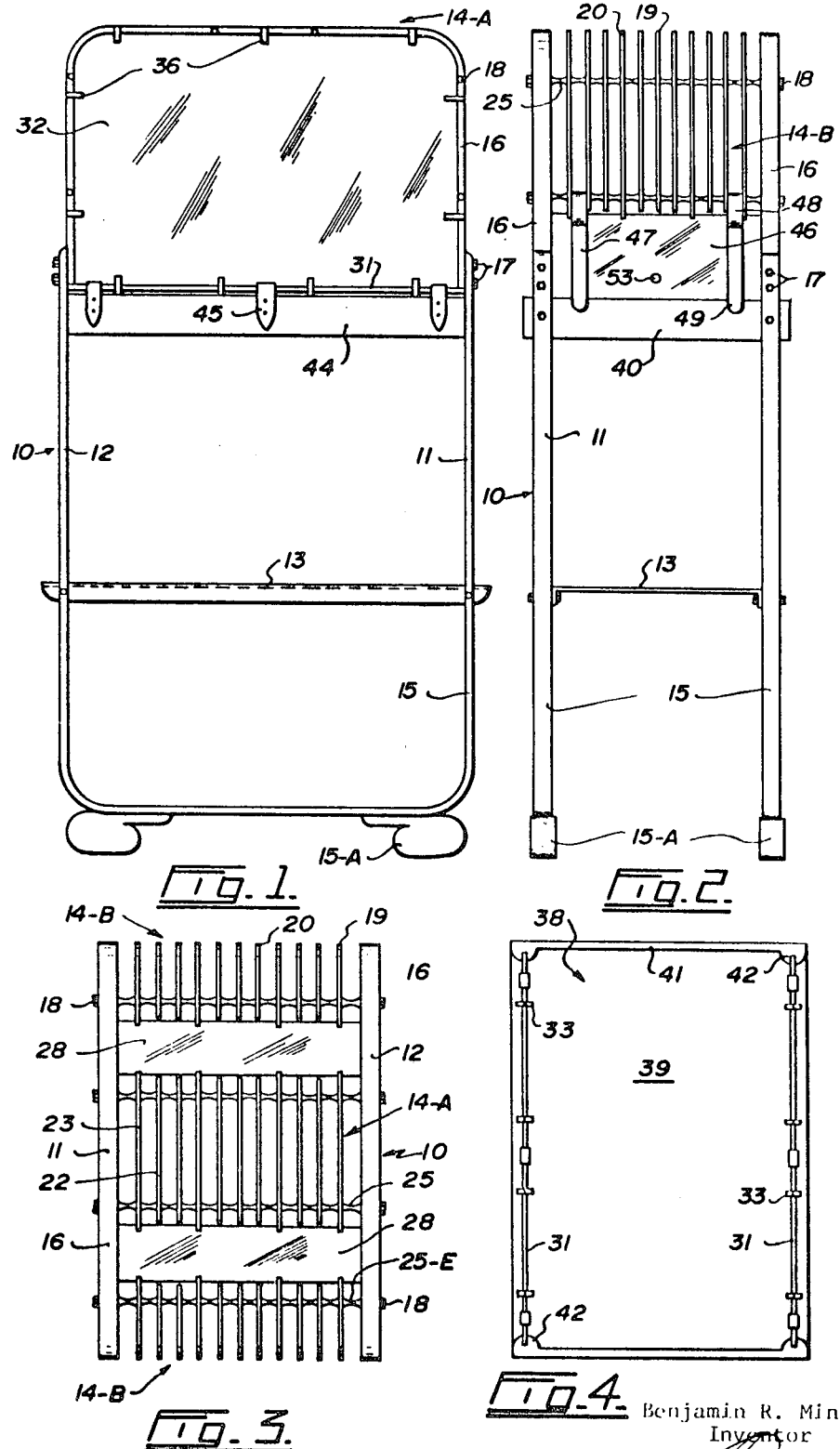
Fig. 1. Fig. 2. Fig. 3. Fig. 4.
Benjamin R. Minness,
Inventor
by 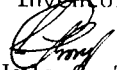
Lyle R. Trorey,
Agent

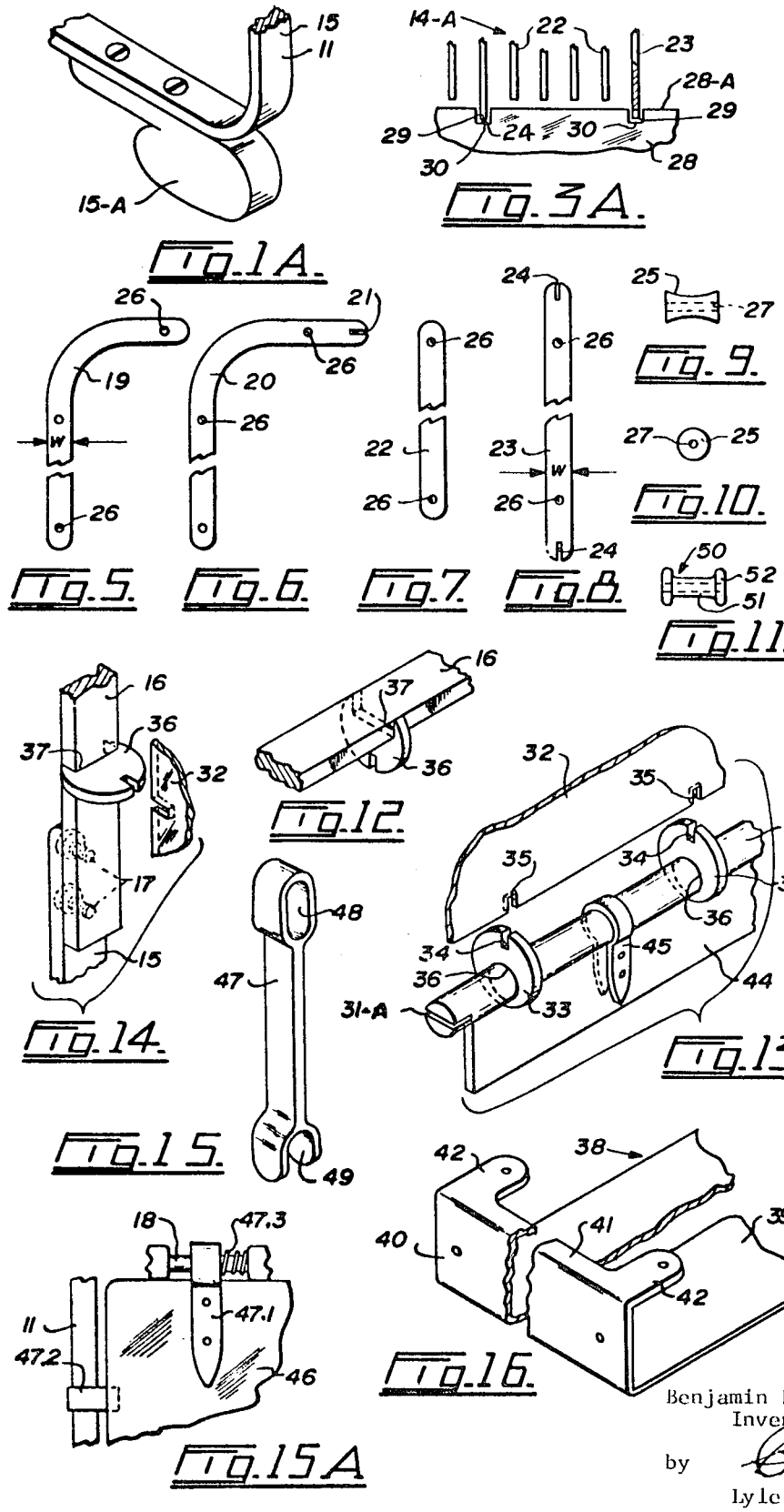

3,605,696
AVIARY STRUCTURE
Benjamin R. Minness, 543 E. 10th Ave.,
Vancouver 10, British Columbia, Canada
Filed Nov. 24, 1969, Ser. No. 879,456
Int. Cl. A01k 31/06
U.S. Cl. 119—17       10 Claims

ABSTRACT OF THE DISCLOSURE

A large aviary structure adapted to protect against a creature attempting to molest a bird, aviary walls having grills of thin flat strips assembled to bars with their flat edges parallel and closely spaced. Strips are at least about half an inch in width and spaced apart a maximum distance of seven sixteenths of an inch. This construction and spacing protects the birds against, for instance, paws and claws of a cat. An additional removable sub-cage is supported on top of the aviary, a bottom opening of the sub-cage in register with a top opening of the large aviary providing access to the sub-cage, the bottom opening being closable by a sliding plate forming, when closed, a base for the sub-cage. Difficulty in catching the birds in the large aviary is reduced as the disturbed birds generally fly upwards—into the sub-cage.

My invention relates to an aviary, the structure of which is particularly adapted to domestic use in substitution for a common bird cage.

Bird cages of well known types commonly include a plurality of vertical wire members defining sidewalls, the vertical members secured to a top and bottom member in spaced relationship, the spaced vertical sidewall wires and top and bottom defining the cage enclosure. Often, there is a horizontal member intermediate the top and bottom members to which horizontal member the spaced vertical wires are additionally secured. This well known construction has a disadvantage that birds can, and do, grasp and perch upon the vertical members—and also upon the horizontal member if there be one—thereby to become vulnerable to attack by cats or rodents. While the paws, for instance of a cat, may not readily be inserted between the spaced wires, the claws can easily reach a bird perched, if only momentarily, upon cage sidewall members.

A further objection of ornithologists and bird fanciers generally is that common domestic bird cages are too small for proper well being of a bird so confined, and far too small for community birds.

Enclosures much larger than the common wire cage can be, and are, made. However these for the most part have the inherent faults above.

I have devised a construction wherein the above disadvantages are greatly reduced, since, in an aviary according to the invention, birds do not like perching, or even attempting to perch, upon the walls of the aviary, and of construction such that the claws of a cat cannot be inserted between and past spaced members. The subject construction is well adapted to be embodied in large units, to form an adequately strong and rigid structure.

These ends are attained by the use of grill elements in the form of thin flat strips, of about half an inch in width and of suitable length.

The grill elements are assembled in a particular spaced relationship to one another with their flat sides generally parallel, the assembly being upon bars secured to a frame structure.

Thickness of the grill elements is not particularly important, and is governed mainly by considerations of strength and cost.

To attain the ends above, the width of the grill elements does exceed the length of the extended claws of, e.g. a full grown cat. It is thus apparent that width cannot be less than a particular value. Similarly, the spacing between adjacent grill elements cannot be greater than a particular amount to prevent, e.g. a kitten, inserting his paw therebetween. Since cats are not the only animals attempting to attack a confined bird, actual requirement is seen to be to provide a width greater than indicated by the longest clawed animal, and a spacing less than that indicated by the smallest pawed animal, from which the protection is, according to the environment, required. It is not particularly intended that the construction of my invention be used for smaller enclosures such as are, at present, common—nevertheless the principles of my invention can be embodied in the smaller cages.

In one embodiment I utilize grill assemblies as above for parts of the sidewalls and top of the enclosure, and separate these assemblies by sheets of transparent plastic material, and have devised a novel grill element adapted to secure the plastic sheet thereto. Means are provided for ready access to the interior of the cage, and for insertion and removal of a pan.

A substantial part of the cost of an aviary according to the invention is labour cost of assembly. Various elements of the aviary are particularly devised to be made up, in a factory, into a number of sub-assemblies, which sub-assemblies are adapted to be assembled with the use only of simple tools, to form a completed aviary. In this way labour costs as paid by the purchaser are saved, and he has further advantage and satisfaction which, as is well known, result from exercise of his natural propensity to build things.

In order to provide a "do-it-yourself" aviary kit, my detail structures have been devised to facilitate assembly and improve the construction generally.

To reduce difficulties of catching birds in relatively large aviaries, combination aviary having a sub-cage mounted on top of the large aviary cage is provide, the birds normally inhabiting the large cage, the sub-cage being provided for bird catching purposes, and can be left on and used as a roost. The combination of a large aviary and a sub-cage can be used with any type of cage construction; however cage construction of grill assemblies and transparent portions as described herein has advantages which have been stated.

According to the present invention, there is provided an aviary construction which protects the bird from domestic and other animals seeking to attack it, this being effected by flat grill elements of not less than a particular width as aforesaid, the grill elements being assembled in flat-side-spaced-relationship, wherein the space is not greater than a particular limit, as has been explained.

The invention further provides structure factory assembled into a number of sub-assemblies, which sub-assemblies and the elements thereof are adapted readily to be assembled to one another to form the completed structure.

A detail description following related to drawings, gives exemplification of embodiments of my invention which, however, is capable of expression in structure other than particularly described and illustrated.

There follows a detail description, and drawings, of a particular embodiment of my invention.

In the drawings:

FIG. 1 is a front elevation of the aviary,

FIG. 1A is a partly fragmented perspective view, at larger scale, showing a foot piece attached to the frame, FIG. 2 is a side elevation of the aviary, FIG. 3 is a top plan view of the aviary, FIG. 3A is a fragmented detail showing means of securing a transparent plastic sheet to a grill assembly, FIG. 4 is a plan view of the bottom assembly, FIG. 5 is a detail of a curved grill strip, FIG. 6 is a detail of a curved grill strip, having a slot at one end, FIG. 7 is a detail of a straight grill strip, FIG. 8 is a detail of a straight grill strip having a slot at each end, FIG. 9 is a detail of a spacer, FIG. 10 is an end view of FIG. 9, FIG. 11 is a detail of a spacer used with a drop hinge element, FIG. 12 is a perspective partly fragmented detail showing a top lock holder element assembled to a top frame member, FIG. 13 is a partly fragmented perspective detail showing a transparent plastic sheet in position for assembly to a hinge flap and tube lock holder sub-assembly, FIG. 14 is a partly fragmented perspective detail showing a transparent plastic sheet in position for assembly to a side lock holder element of a frame side member, FIG. 15 is a perspective detail of a drop hinge element, FIG. 15A is a fragmented detail showing an alternative to the drop hinge element of FIG. 15, FIG. 16 is a fragmented perspective view, at a scale smaller than that of the detail figures, of an end of the bottom element, FIG. 17 is a front view of a combination aviary according to the invention, sides shown simplified for clarity, FIG. 18 is a view of the cage seen from line 18—18, FIG. 17 sides being shown simplified for clarity, FIG. 19 is a top plan view of FIG. 17, FIG. 20 is an enlarged scale side view of a portion of the combination aviary, FIG. 21 is a simplified fragmented section on line 21—21 of FIG. 20, FIG. 22 is a fragmented section of a perch and adjacent sides of the aviary, some parts not being shown in section.

In FIGS. 1, 2, 3, a particular embodiment of the aviary of my invention is indicated generally by the numeral 10. A front frame 11 is secured in spaced relationship to a rear frame 12 by means of a shelf 13, a top or central grill structure 14–A, and side grill structures 14–B. Each frame has a lower U-shaped member 16, the inside width of the top of the lower member is substantially that of the outside width of the bottom of the upper member so that the two members overlap as seen in FIG. 1, to be secured to one another to form generally rectangular front and rear frames, 11 and 12 aforesaid. The U-elements are rectangular in section and are secured by two or more bolt means 17.

Corresponding front and rear frame U-members are of the same size and shape, hence the front and rear frames, as assembled, are interchangeable. As seen in FIGS. 1, 1A, and 2, four feet i.e. slides 15–A are secured to bottom walls of the lower frame members 15.

The grill structures 14–A, B, aforesaid include rods 18, see FIGS. 2 and 3, of length somewhat greater than the distance between the frames. FIGS. 5, 6, 7, 8 show respectively, a curved grill strip 19, a curved grill strip member 20 having a slot 21 at one end, a straight grill strip member 22, and a straight grill strip element 23 having a slot 24 at each end—note that the slotted element 23 is longer than the member 22. All of the grill elements have the same width, which width is designated W in FIGS. 5 and 6 only.

The grill structures are formed by assembling the required grill strips to the rods 18 spaced from one another by means of spacers 25, FIGS. 9 and 10.

The straight members 22 have holes 26 equally spaced from the ends thereof, and the straight slotted members 23 have holes 26 also equally spaced from the slotted ends and the same distance apart as the holes 26 of the members 22.

The central grill structure 14–A is formed by assembling straight grill members 22 and element 23, separated by spacers 25, to two rods 18. As seen in FIG. 3, there are several short, unslotted, elements 22 between adjacent longer slotted elements 23, to form the assembly shown wherein ends of the longer slotted members extend beyond the ends of the shorter unslotted members.

The side grill structures 14–B, FIGS. 2 and 3, are generally similar assemblies of the curved grill strips 19 and 20. Several unslotted elements 19 are placed, separated by spacers 25, between the slotted curved member 20 so that, as before, the slotted ends extend outwards—as is seen in FIG. 3. While, see FIGS. 5 and 6, the holes of the members 10 and 20 are in register for passage of rods 18 therethrough, the ends of the curved member 20 having the slot 21 extends further from the adjacent hole 26 than does a corresponding end of the curved member 19 from the corresponding hole thereof—so that the slotted ends of the members 20 extend outwards of the ends of the members 19 as shown.

In FIG. 3, the numerals 25–E designate end spacer elements of an assembly of grill strips to a rod 18. See now FIG. 10, in at least the end spacing elements 25–E of the said assembly the diameter of the hole 27 is a press fit to the rod 18. Thus, when the grill units and spacers are assembled to the rod in the before described manner, and the end spacing elements 25–E are pressed on the rod, a secure assembly results. The intermediate spacers and the holes 26 of the grill elements can be a sliding fit to the rod. All assemblies of spacers and grill elements to the rods 18 are, in this respect, the same. An alternate construction, not illustrated, uses for instance a C-ring cooperating with a suitable groove of the rod to secure the end elements.

As seen in FIG. 3, the side grill assemblies 14–B are spaced from the central grill 14–A and, in each space so formed, a transparent plastic wall member 28 is placed. As seen in FIG. 3A only, an edge 28–A of the member 28 has slots 29 somewhat wider than the width of the grill strips 23, which slots have bottom walls 30. In FIG. 3A the transparent member 28 is shown separated from the central grill, when assembled the bottom walls 30 of the said slots are against, or close to, bottom walls of the slots 24 of the grill strips 23—in which position the edge 28–A is just clear of the ends of the grill strips 22. The grill edge opposite the edge 28–A is similarly shaped and cooperates in the same manner with the grill assembly 14–8.

Referring now to FIG. 1, associated with the top inverted U-member 16 is a transverse tube 31 defining, with the U-member, a generally rectangular space in which is inserted a front transparent plastic member 32.

Means of securing a bottom edge of the transparent member to the tube 31 are best seen in FIG. 13 which shows rod lock holders 33 having slots 34 cooperating with slots 35 of the plastic member. The holders 33 have holes 36 for passage of the tube 31 therethrough.

Side and top lock holders 36 FIG. 1 are used to secure, respectively, the sides and tops of the transparent member 32. The lock holders 36 are slotted to engage corresponding slots of the sides and top of the transparent member as the rod lock holders aforesaid. The portion of a lock holder 36 in engagement with a frame part 16 has a rectangular slot 37, FIGS. 12 and 14, to accommodate the frame.

A bottom structure 38, shown fragmented in FIG. 16, has a base 39, side walls 40, extending inward from the top of each end wall, a portion 41 parallel to the base, and inwardly extending lugs 42 of the portion 41. See now FIG. 13, each end of the tube 31 is slotted as at 31–A for obvious attachment to a lug 42. As best seen in FIG. 2, the side walls 40 are bolted to the front and rear frame members. A flap 44 is attached to the tube 31 by the hinges 45. The vertical dimension of the flap is slightly greater than the height of the side walls 40, FIG. 16, so that the flap, hanging vertically, forms an end closure to the base structure 38. The hinged flap is duplicated at the rear frame 12 so that the base structure and the said flaps define a shallow enclosure. A flat shallow rectangular pan of suitable size, not shown, may thus be inserted in the said enclosure through either flap, and removed for cleaning.

Referring to FIG. 2, the numeral 46 indicates a door of transparent plastic material hinged about spacers of a rod 18 aforesaid, by means of drop hinges 47, shown in detail in FIG. 13. As seen in FIG. 15, the hinge has an opening 43 at one end, which opening is elongated having spaced parallel sidewalls and circular end walls. The other end of the hinge terminates in a forked configuration 40.

FIG. 11 shows a spacer 50 having a cylindrical central portion 51 the diameter of which is somewhat less than the spacing between the sidewalls aforesaid, and circular end portions 52 of diameter greater than the aforesaid spacing. One end 52 is obviously removable from the central portion 51 for insertion of the spacer in the opening 48 of the drop hinge, or both ends can be spacing washers. Alternatively, a tube can be used in lieu of the portion 51.

When the foregoing door structure is assembled as seen in FIG. 2, in the closed position shown, the door is secured by engagement of the hinge fork 49 with the base side wall 40. The length of the elongated opening 48 (FIG. 15) of the drop hinge is such that the door may be lifted disengaging the forks, so to permit opening of the door 46. A knob 53 is provided to facilitate lifting. The upper edge of the door 46 has a plurality of slots constructed and arranged so that, in opening and closing, there is no interference with the grill members of the grill assembly 14–B. Alternatively the upper edge may be sttraight defining a height of the door sufficient to provide clearance adequate for lifting.

FIG. 15A shows alternative means of hinging and securing the transparent door 46, wherein the door is swingable of the rod 18 aforesaid on a hinge 47.1, the front frame 11 having, in this alternative, a stop 47.2. Spring means 47.3 in operative engagement with the rod 18 and the door 46 urge the door to a closed position against the stop 47.2—it being understood that the spring means 47.3 is of strength adequate to prevent the door being opened by a bird.

Mention has been made that, to achieve the desired protection, the width of the grill elements is not less than a particular value, and that the spacing between adjacent grill elements does not exceed a particular value. Considerations governing these values have been recited. For protection against the common cat, I find that the width of all grill elements—namely dimensions W, FIGS. 5 and 7—should be at least about half an inch, and that the spacing between adjacent grill elements should be less than about seven-sixteenths of an inch. It is to be understood that in different environments, where for instance protection against rodents is required, the spacing should be reduced. Similarly, where protection might be required only against creatures having larger claws, W would be increased.

The grill elements as herein disclosed, for instance the element 23 FIG. 8, are solid rather thin members of width W. Alternatively, the said elements can be open having a front edge member and, spaced therefrom, a rear edge member, so that the element has an overall width W as defined by the distance between the said front and rear edges. Such grill elements might be stamped from sheet stock, or have front and rear edge members of wire, or be otherwse fabricated to be equivalent to the grill elements herein illustrated.

It will be apparent to those skilled in the relevant arts, that the structure described is well adapted so that particular sub-assemblies, for instance the grill units 14–A, 14–B, can be factory produced.

It is also seen that other sub-assemblies may be completed in the factory, and that such sub-assemblies are well adapted to final do-it-yourself assembly.

Particular attention has been given to sub-assemblies such as will facilitate packaging and, without at this time detailing these, it is evident that the sub-assemblies and hardware may be packed compactly, so to facilitate transportation and storage.

I have described a particular embodiment, and given some alternative constructions. A central concept of my invention is the protective grill means described; and the combination thereof with novel structural detail, and with known elements, to achieve the stated objects.

Description of an embodiment shown in FIGS. 17 through 22 of the drawings follows.

Referring to FIGS. 17, 18, 19, a combination aviary according to the present invention is designated generally 60 in FIG. 17, and has a large aviary 61, and a sub-cage 62 mounted centrally on top of the large aviary. Perches 63 and 64 are provided in the large cage, which cage has supporting legs 65 as shown. The large aviary 61 has a top 66 of sheet metal having an upwardly bowed upper surface. Centrally located within the roof 66 is a rectangular access opening, hereinafter large aviary opening, see FIG. 19, defined by sides edges 67 through 70, the opening being means providing access through the top to the sub-cage. Sides of the large aviary are designated 71 through 74, and as stated before can be either transparent with grill assemblies as previously described or can be of conventional wire mesh or rods.

The sub-cage 62 has four sides 75 through 78. These too can be transparent with grill assemblies or can be of wire mesh or rods. The sub-cage is provided with two perches 79 and 80. A roof 82 has a carrying handle 81, and is provided with a sliding trap door 83 which is opened when removing birds from the sub-cage, the trap door 83 having a bent-up edge providing a handle 83.1 for gripping when opening or closing. The sub-cage has a removable base which serves also as a means to close the large aviary opening, to be described.

Four pegs each designated 84 can be provided to protrude outwards from the sides 75 and 77 as shown in FIG. 7, the pegs protruding sufficiently to provide means to support the sub-cage when resting on the roof 66 of the large cage.

Referring to FIGS. 20 and 21, the sides 75 and 77 of the sub-cage extend to lower edges 75.1 and 77.1, lower portions of the sides being adjacent short vertical opposing side walls 87 and 88 of the rectangular opening within the top 66.

A plate 85, having raised outer edges 85.1 and 85.2, is provided as a means to close the large aviary opening of the top 66 thus sealing the sub-cage from the large cage and providing a removable base for the sub-cage. The plate has a perimeter defined by the sides of the sub-cage 75 through 78, the raised outer edges 85.1 and 85.2 providing stiffness and improving closure of the opening. As can be seen, the plate 85 which is slidable seals two openings which are in register, namely the large aviary opening in the top 66 having side edges 67 through 70 and an opening defined by lower edges of the sides 75 through 78 of the sub-cage, hereinafter sub-cage opening. The sidewalls 87 and 88 have lower edges 87.1 and 88.1, the edges extending downwards from the top 66 improving rigidity of mounting of the sub-cage on top of the large aviary.

Four pegs 86 (two only being shown) protrude inwards from the lower edges 75.1 and 77.1 and support the plate 85. Clearance between the outer edges 85.1, 85.2 and the sides 75, 77 is provided permitting sliding withdrawal of the plate 85, which leaves the opening free for birds to enter the sub-cage. When supported on the pegs 86, the plate 85 forms the base of the sub-cage and when the sub-cage is removed from the large aviary, the large aviary opening is clear of a closure.

As birds tend to fly away from actions that disturb them, it is considered that a closure for the large aviary opening when the sub-cage is removed is unnecessary for most bird-transferring purposes. Birds remaining in the large aviary tend to shy away from activity occurring when the sub-cage is removed and rarely escape immediately through the large aviary opening. If birds required to remain in the large aviary persistently escape when the sub-cage is removed, a simple plate (not shown) can be provided to close the large aviary opening.

To reduce movement of the sub-cage in directions shown by an arrow 90, the lower edges 75.1 and 77.1 can be provided with notches 91, at each end of each lower edge, only one notch being shown in FIG. 20. Each notch has a corner 91.1 which accepts a side wall 68 or 70 of the opening, notch structure thus supporting the sub-cage. When on top of the large aviary the sub-cage is thus supported by the four pegs 84 resting on the roof 66 and two notches 91 resting on the side walls 68 and two notches on the side wall 70.

Means to support the sub-cage on the top of the large aviary can be as above described or can be either the pegs 84, or notch structure. If the pegs 84 are used without the notch structure, stops or indentations (not shown) can be provided for the pegs 84 to prevent movement of the sub-cage in the directions shown by the arrow 90.

Referring to FIG. 22, the perch generally 63 has a cylindrical rod 93, the rod being provided near one end with a tapered resilient collar 94. The sides 71 and 73 of the cage are as shown, the side 71 having an opening 95, the side 73 having a smaller opening 96. The opening 95 has a diameter that admits the collar 94 but prevents the collar passing through completely so that the collar can be inserted and jammed in the opening 95. The rod 93, at an end remote from the collar, has a diameter that is an easy sliding fit in the opening 96. A small rotation of the perch with an axial force applied inward into the cage, i.e. a screwing action, produces sufficient friction between the opening 95 and the collar to secure the perch, the perch and collar being a removable perch means. Thus the perch can be removed from the cage from outside the cage, thus disturbing the birds less than if a hand were inserted in the cage to remove the perch. All perches used in the combination aviary can come within this description.

What I claim is:

1. Aviary enclosure structure particularly adapted to protect against a creature attempting to molest a bird within the aviary structure, the structure being characterized by:
   (a) an assembly of grill wall elements formed of thin flat vertical strips with flat sides thereof in generally parallel spaced relationship and presenting their thin edges outwardly of the structure,
   (b) the assembly of thin flat strips being mounted upon bars secured to a frame of the structure,
   (c) the grill elements being flat strips having a width of at least about half an inch, and having their flat sides spaced apart by a distance less than about seven-sixteenths of an inch to define a means to prevent penetration of any portion of a molesting creature's paw.

2. Structure as defined in claim 1 having an assembly of grill elements, and means to secure a side edge of an adjacent wall member to an outwardly extending end of a said grill element.

3. Structure as defined in claim 1, having an assembly of grill elements wherein an outwardly extending end of an element is slotted to receive a side edge of an adjacent wall member.

4. Structure as defined in claim 3, further characterized by means to hinge a door about one rod aforesaid, and means to secure the door in a closed position.

5. Structure as defined in claim 4, and drop hinge means to secure the door in a vertical closed position.

6. Structure as defined in claim 4, having spring means to secure the door in a vertically closed position.

7. Structure as defined in claim 1, being a large aviary (61) having a top (66) and
   (a) a sub-cage (62)
   (b) means (91 and/or 84) to support the sub-cage on the top,
   (c) means (defined by 67–70) providing access, through the top, to the subcage,
   (d) means to close the access, constructed and arranged to provide a combination aviary.

8. Structure as defined in claim 7, the means providing access through the top being an opening, and slideable plate means to close the opening and to provide a removable base for the sub-cage.

9. Structure as defined in claim 7, the combination aviary having at least one removable perch means (63, 93, 94).

10. A combination aviary (60) as defined in claim 1 including a large aviary portion (61) having a roof, and a sub-cage portion (62) including a floor on top of the large aviary portion, the combination being characterized by
   (a) means to support the sub-cage on the roof of the aviary portion,
   (b) means providing access, through the aviary roof and through the floor of the sub-cage portion, to the sub-cage interior,
   (c) at least one removable perch means,
   (d) means to close the means providing access to the sub-cage.

References Cited
UNITED STATES PATENTS

| | | | |
|---|---|---|---|
| D. 165,567 | 12/1951 | Yellin | 119—17X |
| 2,364,836 | 12/1944 | Whitehead | 119—17 |
| 2,544,496 | 3/1951 | Gass | 119—17 |
| 2,725,036 | 11/1955 | Petrie | 119—17 |
| 3,381,664 | 5/1968 | Barlocci | 119—17 |

ALDRICH F. MEDBERY, Primary Examiner

U.S. Cl. X.R.

Des. 30—4; 119—22